(12) United States Patent
Schultz et al.

(10) Patent No.: US 6,411,812 B1
(45) Date of Patent: Jun. 25, 2002

(54) METHOD AND ARRANGEMENT IN A RADIO COMMUNICATIONS SYSTEM

(75) Inventors: Johan Schultz; Nina Kopp, both of Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/339,946

(22) Filed: Jun. 25, 1999

(30) Foreign Application Priority Data

Jun. 26, 1998 (SE) ............................................... 9802302

(51) Int. Cl.[7] ................................................ H04Q 7/20
(52) U.S. Cl. ...................... 455/466; 455/455; 455/454; 370/321
(58) Field of Search ................................ 455/422, 450, 455/452, 453, 455, 458, 445, 511, 440, 443, 552, 553, 515; 370/433, 435, 337, 347, 338, 237, 329, 468, 352, 330

(56) References Cited

U.S. PATENT DOCUMENTS

| | | | | |
|---|---|---|---|---|
| 4,831,373 A | | 5/1989 | Hess | |
| 4,870,408 A | * | 9/1989 | Zdunek et al. | 340/825.03 |
| 5,528,664 A | * | 6/1996 | Slekys et al. | 379/58 |
| 5,729,541 A | * | 3/1998 | Hamalainen et al. | 370/337 |
| 5,768,267 A | * | 6/1998 | Raith et al. | 370/329 |
| 5,991,286 A | * | 11/1999 | Labonte et al. | 370/337 |
| 6,061,549 A | * | 5/2000 | Labonte et al. | 455/552 |
| 6,246,875 B1 | * | 6/2001 | Seazholtz et al. | 455/432 |

FOREIGN PATENT DOCUMENTS

| | | |
|---|---|---|
| WO | WO 95/16330 | 9/1995 |
| WO | WO 97/19569 | 5/1997 |
| WO | WO 98/27762 | 6/1998 |

* cited by examiner

*Primary Examiner*—Edward F. Urban
*Assistant Examiner*—Charles Craver
(74) *Attorney, Agent, or Firm*—Burns, Doane, Swecker & Mathis, L.L.P.

(57) ABSTRACT

The present invention relates to a method and an arrangement in a cellular radio communications system, where channels optimised for voice transmission TCH and channels optimised for data packet transmission PDCH are used. All channels optimised for data packet transmission may be reconfigured into channels optimised for voice transmission if it is unlikely that packet data services are to be requested. This is performed if no data packet sessions are going on in neighbouring cells and no subscriber stations are registered in a location area containing the cell in a manner indicating that they are prepared to perform packet data communication.

5 Claims, 5 Drawing Sheets

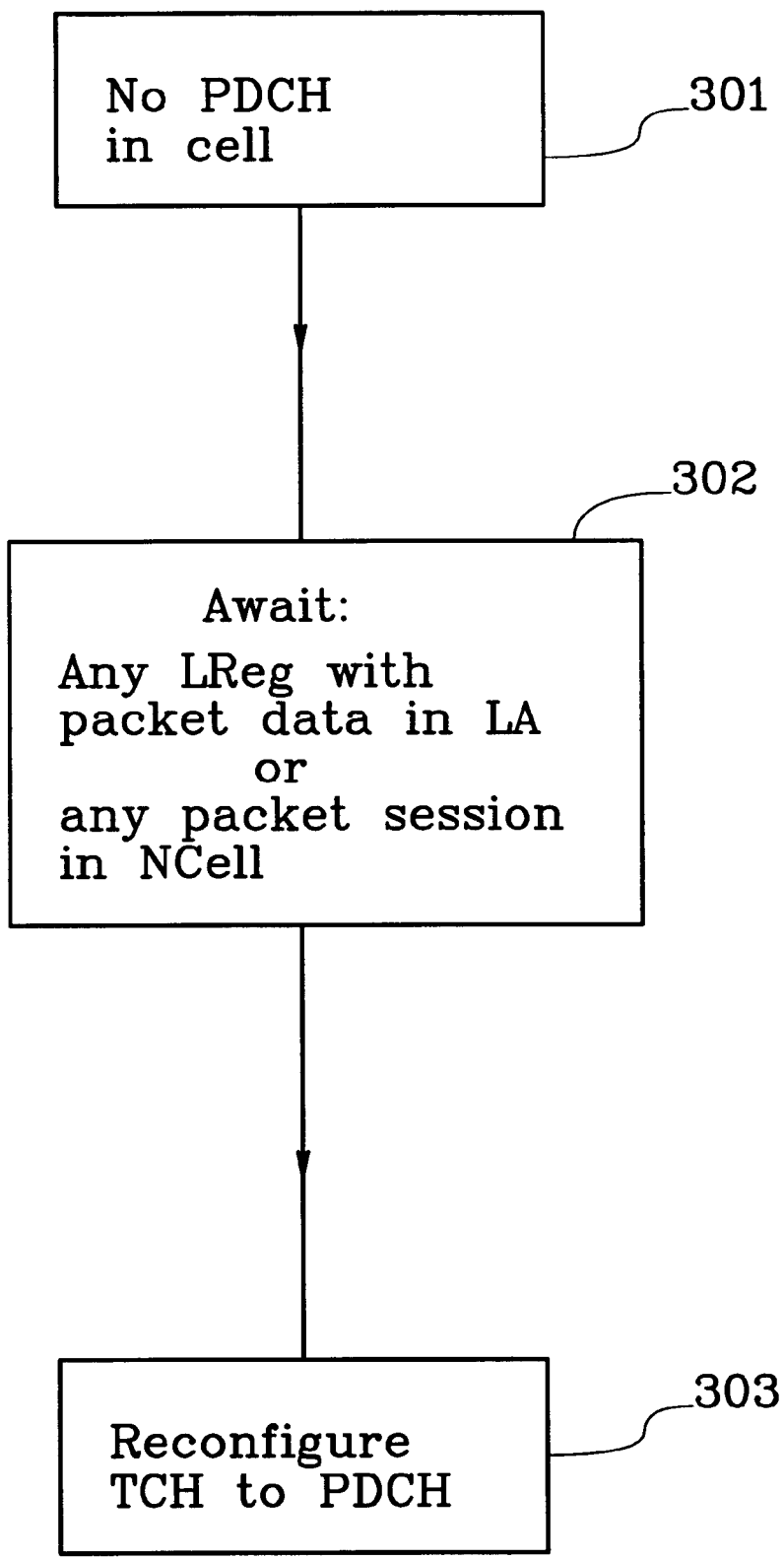

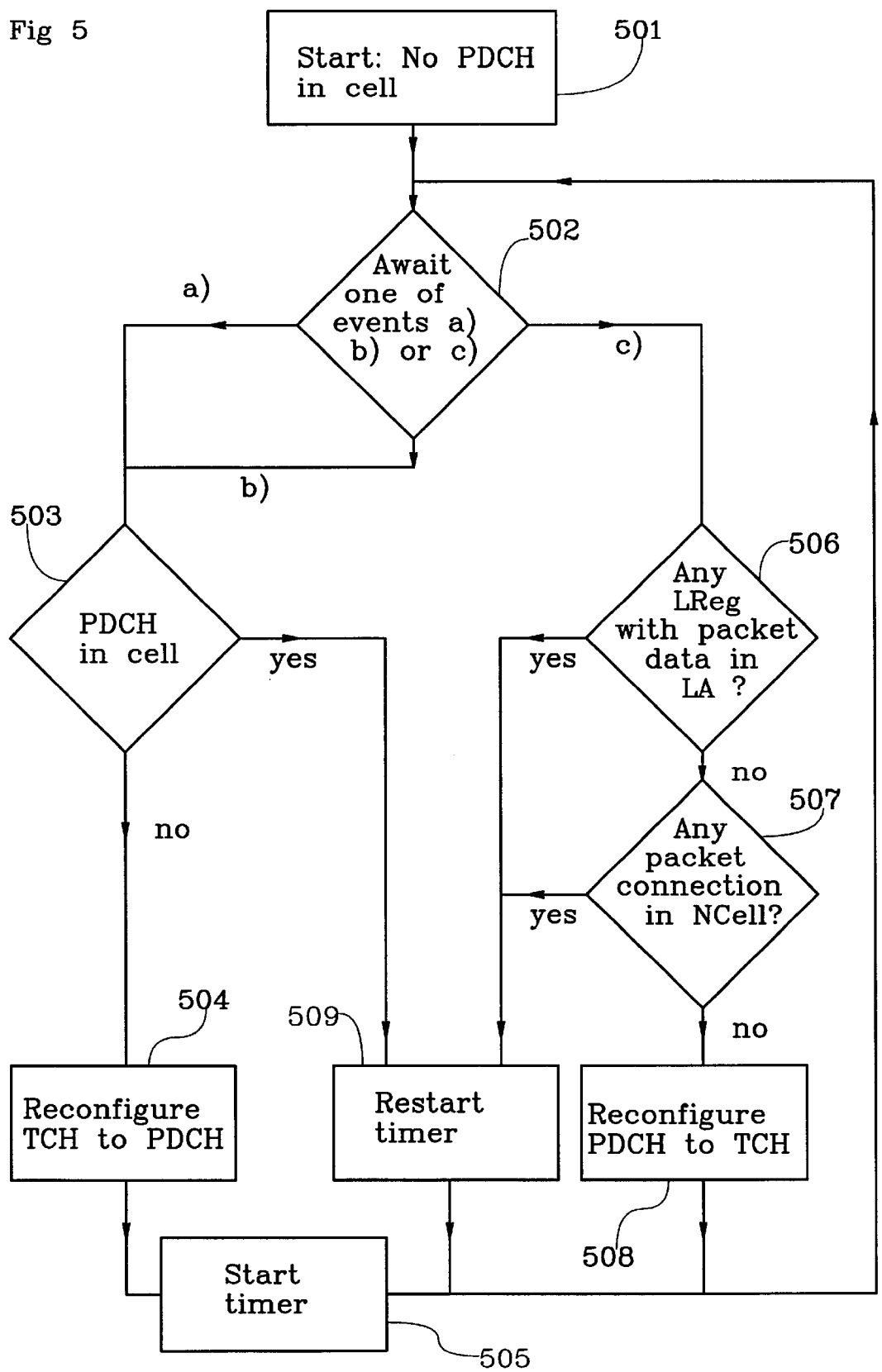

METHOD AND ARRANGEMENT IN A RADIO COMMUNICATIONS SYSTEM

This application claims priority under 35 U.S.C. §§119 and/or 365 to 9802302-1 filed in Sweden on Jun. 26, 1998; the entire content of which is hereby incorporated by reference.

TECHNICAL FIELD OF THE INVENTION

The invention relates to a method and an arrangement in a cellular radio communications system comprising a plurality of cells. Each cell is assigned a number of channels constituted by timeslots and frequencies and these channels may be configured to be adapted for either voice transmission or data packet transmission in order to obtain spectrum efficiency.

More particularly, the invention relates to systems where subscriber stations in a cell are registered in the system with respect to a location area containing this cell in a manner indicating that they are prepared to perform voice transmission, packet data transmission or both.

BACKGROUND OF THE INVENTION

Such a system is described in WO, A1, 95/16330, which is referred to herein by reference. This document suggests a system where channels have configurations adapted for voice transmission or packet data transmission. A channel adapted for packet data transmission is arranged to be shared among a number of users in order to take advantage of the bursty nature of packet data services. Such channels may also use more than one timeslot in a transmission frame. The channels may be allocated for voice or packet data use dynamically, depending upon demand of the respective services. The normal state in the system according to this document is that at least one packet data channel is available in each cell. In a described embodiment, however, there may exist cells where packet data channels are available only on demand.

SUMMARY OF THE INVENTION

A drawback with systems having at least one packet data channel, henceforth named PDCH, available in each cell is that valuable bandwidth is wasted in cells where packet data communication seldom takes place. Subscribers in the system requesting to perform voice communication might be locked out despite the presence of unused bandwidth. Therefore the system resources are not used effectively.

In systems where PDCHs in a cell are set up only on demand, on the other hand, another disadvantage exists. If PDCH a is set up only on demand, subscribers requesting packet data services will be locked out if all channels are used for voice transmission as traffic channels, henceforth named TCHs. This problem will also affect subscribers already in packet data communication if they migrate into a cell where no PDCH can be set up for the same reason. These subscribers will find their communication shut down. Therefore these systems will be quite unreliable. Reliability is particularly important for packet data services subscribers, since these services are often used professionally and are more sensitive to disturbances.

One object of the present invention is to provide a cellular system for voice and packet data service with improved system resource economy where reliability is maintained.

This object is achieved according to a first aspect of the invention by a method in a system of the initially mentioned kind where a first cell in said system has one PDCH and where said PDCH is currently unused. Briefly, the inventive method includes a first checking procedure to find out whether any subscriber station in said first cell is registered in the system with respect to said first cell in a manner indicating that it is prepared to receive or transmit packet data. If this is not the case, a second checking procedure is carried out to find out if any packet data sessions are performed by any subscriber station in any of the neighbouring cells of said first cell and if not, then said PDCH is reconfigured into a TCH.

The result of this method is that the single PDCH in the cell is reused as a TCH only if the probability that packet data services will be requested in the cell is very low. Thereby system resource economy and/or reliability are improved.

In an embodiment of this method, the first checking procedure is performed to find out if any subscriber station that is registered in the system with respect to any location area containing the cell is prepared to receive or transmit packet data. If this is not the case, then consequently no such subscriber station resides in the cell. The method according to this embodiment is easily integrated with existing cellular systems on the market.

In another embodiment of this method, the second checking procedure is performed only for subscriber stations in neighbouring cells that are non-stationary, resulting in improved efficiency.

According to a second aspect of the invention the above mentioned object of the invention is achieved by a method in a system of the initially mentioned kind, where a first cell in the system has no packet data channel. Briefly, the method consists in awaiting any one of the two following events: a) That a subscriber station is registered in the system with respect to said first cell in a manner indicating that it is prepared to receive or transmit packet data. b) That a packet data session has begun in, or transferred to, any neighbouring cell of the first cell. If any of the events a) or. b) takes place then a TCH is reconfigured into a PDCH.

The result of this method is that a PDCH is established as soon as the probability that packet data services will be requested increases. Thereby system resource economy and/or reliability is improved.

In an embodiment of this method, the event a) occurs if any subscriber station is registered in the system with respect to any location area containing the cell in a manner indicating that it is prepared to receive or transmit packet data. If this is the case, then consequently such a subscriber station possibly resides in the first cell. The method according to this embodiment is easily integrated with existing cellular systems on the market.

In another embodiment of this method, the event b) occurs only with respect to subscriber stations in neighbouring cells that are non-stationary, resulting in improved efficiency.

The first mentioned method is then characterised as it appears from the characterising part of the appended claim 1.

The second mentioned method is then characterised as it appears from the characterising part of the appended claim 4.

An arrangement for carrying out the first mentioned method is characterised as it appears from the characterising part of the appended claim 7.

An arrangement for carrying out the second mentioned method is characterised as it appears from the characterising part of the appended claim 8.

BRIEF DESCRIPTION OF THE DRAWINGS

The invention will now be more fully described with reference to the accompanying drawings.

FIG. 3 is a flow-chart which illustrates a method in a cellular communications system according to the second aspect of the invention

FIG. 5 illustrates a method in a system, according to a particularly preferred embodiment, operating according to both the first and the second aspects of the invention.

DESCRIPTION OF PREFERRED EMBODIMENTS

Figure 1:
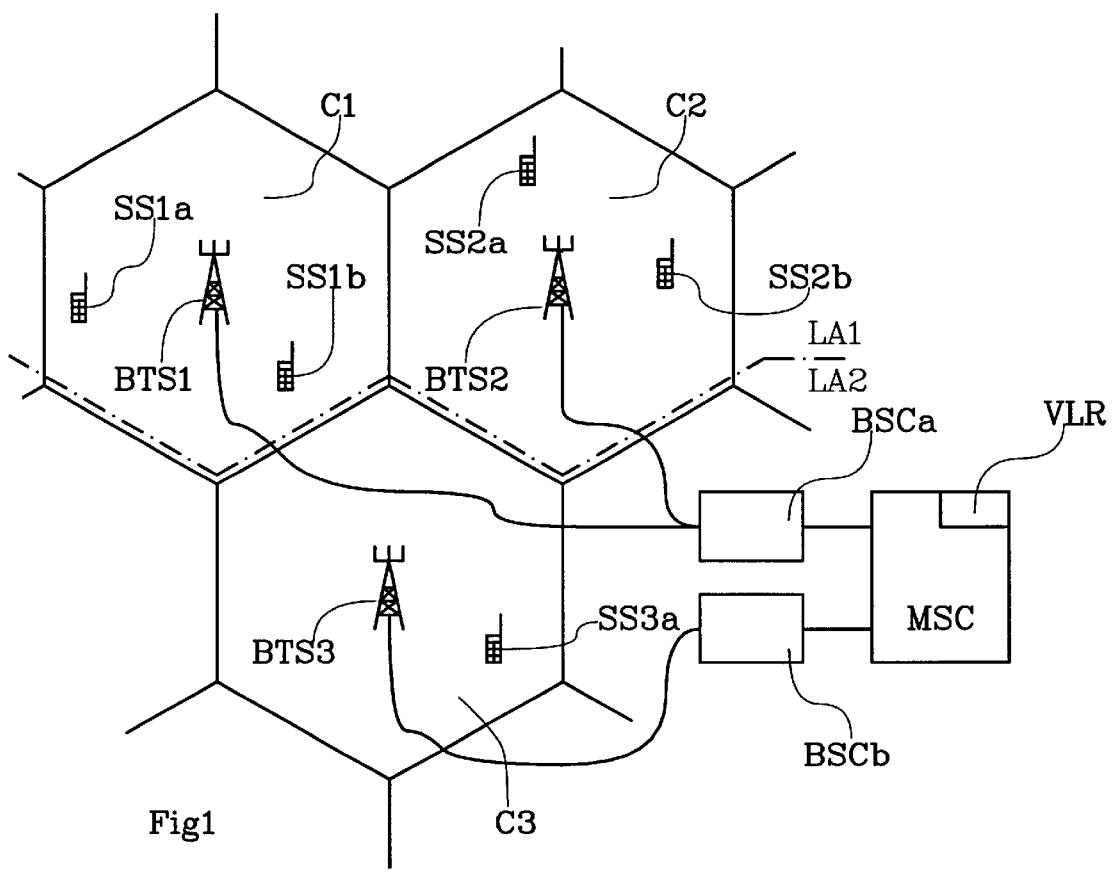
FIG. 1 illustrates a cellular radio communications system according to the state of the art.

FIG. 1 illustrates a cellular radio communications system according to the state of the art. The system comprises a number of cells C1, C2, C3, each defining a geographical area. In this case a base transceiver station BTS1, BTS2, BTS3, is provided centered in each cell for transmitting and receiving omnidirectionally. The invention, however, is applicable also for systems where base transceiver stations are placed in intersections between three adjacent cells, transmitting and receiving separately in three 120 degrees circular segments.

The system comprises also a number of base station controllers BSCa, BSCb, each controlling at least one base transceiver station. Furthermore the system comprises a number of mobile services switching centres MSC, one of which is shown. The MSC provides switching services for the subordinated BSCs BSCa, BSCb. The MSC comprises information storage means such as a visitor location register, VLR which in some systems is called gateway location register GLR. It is also in contact with other information storage means such as a home location register (not shown).

The system is divided into a number of location areas LAs, LA1, LA2, etc; each LA comprises a number of cells. In some systems the LAs may be overlapping, i.e. a cell may belong to more than one LA. A LA may have several BSCs, but normally belongs to one MSC.

Each cell normally comprises a number of subscriber stations SS1a, SS1b in cell C1; SS2a, SS2b in cell C2; SS3a in cell C3, etc. These stations may be of different types. Some are portable, handheld mobile stations, while others may be permanently mounted in a vehicle. Some of the subscriber stations may be stationary, for instance, as payphones. Subscriber stations may also be integrated in, e.g., vending machines where they can automatically report status and occurring errors to an operator.

Some of these subscriber stations may have the capability to transmit and receive only packet data, while others only have the capability to perform voice communication. Some stations have the capability to perform both voice and data communication. A station will normally be registered in the system when it is turned on. This registration may be updated regularly even if the subscriber station remains unused. Normally the VLR contains the information registered, which consists of an indication in which location area the subscriber station resides and supplementary information such as whether the subscriber station is prepared to perform voice communication or data communication or both. In most systems on the market an idle subscriber station may move freely within a LA without updating its location registration. If a subscriber station leaves a first LA its location registration will be updated in the VLR. This registration will indicate that the subscriber station belongs to a second LA. If the second LA belongs to a different MSC than the first one, then also the home location register of the system will be updated accordingly.

Figure 2:
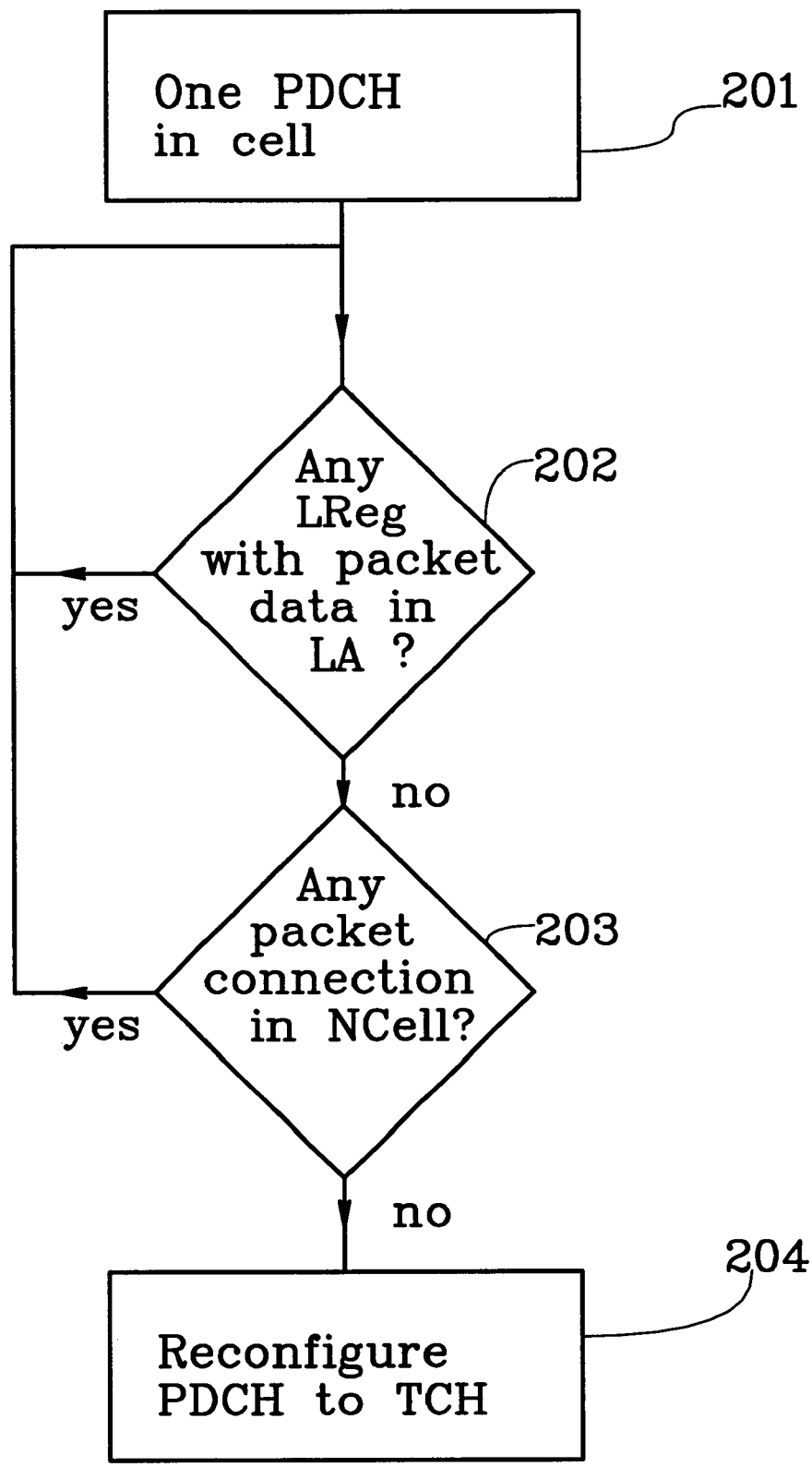
FIG. 2 is a flow-chart which illustrates a method in a cellular communications system according to the first aspect of the invention

FIG. 2 is a flow-chart which illustrates a method in a ellular communications system according to a first aspect f the invention. In the initial state 201, a first cell e.g. cell C1 in the system has one PDCH, which is currently unused. A first checking procedure 202 is performed to find out whether any subscriber station is registered in the system with respect to said first cell in a manner indicating that it is prepared to perform packet data communication. Ideally this checking procedure shall find out whether any such subscriber station resides in the cell. In systems such as the GSM system, however, an idle subscriber station may move freely between the cells in its LA without updating its location registration LReg vis-à-vis the system. Therefore, the first checking procedure in such cases is performed in the VLR to find out whether any such subscriber station is registered in any LA containing the cell. If this is the case then a subscriber station in packet data mode may reside in the cell, if not then no such subscriber station is located in the cell.

If the answer of the first checking procedure is yes, then the system returns to the initial state 201. If the answer of the first checking procedure is no, then a second checking procedure is performed. The second checking procedure is performed in order to find out whether any packet data session is going on in any neighbouring cell e.g. cell C2 of the first cell C1. If the answer of the second checking procedure is yes then the system returns to the initial state 201. If the answer is no, then the PDCH of said first cell is reconfigured 204 into a TCH.

It is evident that the two checking procedures of this method can be performed in a different order, this is within the scope of the appended claims. These checking procedures are preferably performed frequently as long as there is a PDCH in the cell to reconfigure.

FIG. 3 is a flow-chart that illustrates a method in a cellular communications system according to a second aspect of the invention. In this method the starting condition 301 is a situation in a first cell e.g. C1 where all channels are configured as TCHs. The system awaits 302 any one of the following events:

a) A registration in the system with respect to the first cell, for instance a location registration LReg in the visitor location register VLR, indicating that a subscriber station in any location area LA containing said first cell is prepared to perform a packet data communication.

b) A packet session has started in, or has been transferred to, any neighbouring cell e.g.C2 of the first cell.

If any of these events occurs a TCH is reconfigured 303 into a PDCH.

Figure 4A:
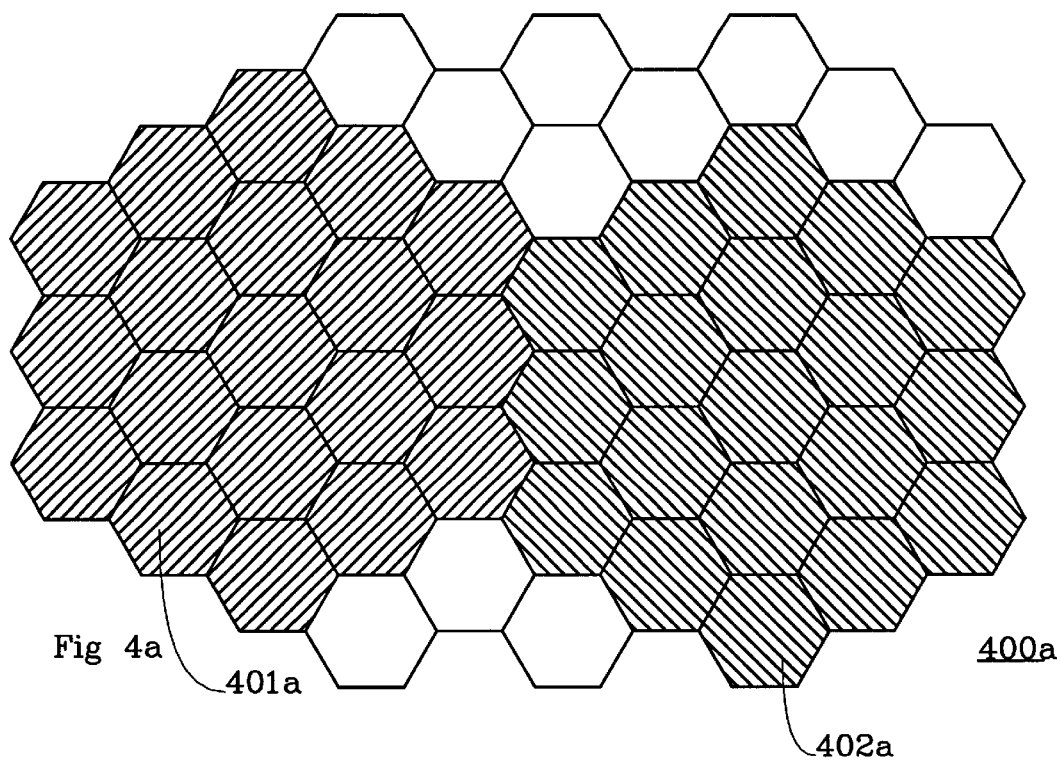
FIGS. 4a and 4b illustrate the concept of location areas according to the state of the art.

FIG. 4a describes a public land mobile system PLMN 400a, where each cell belongs to only one Location Area. The cells are drawn as hexagons and each is provided with at least one Base Station Transceiver. Each mobile station in the PLNM must be registered in the system as residing in a particular Location Area. Since the LAs 401a, 402a, shown as hatched areas, are not overlapping a mobile station residing in a cell can only be registered as belonging to one single LA. Examples of systems with non-overlapping location areas are the GSM and D-AMPS systems. In such systems the procedure 202 shown in FIG. 2 and the procedure 302 shown in FIG. 3 need only be performed with respect to one location area.

Figure 4B:
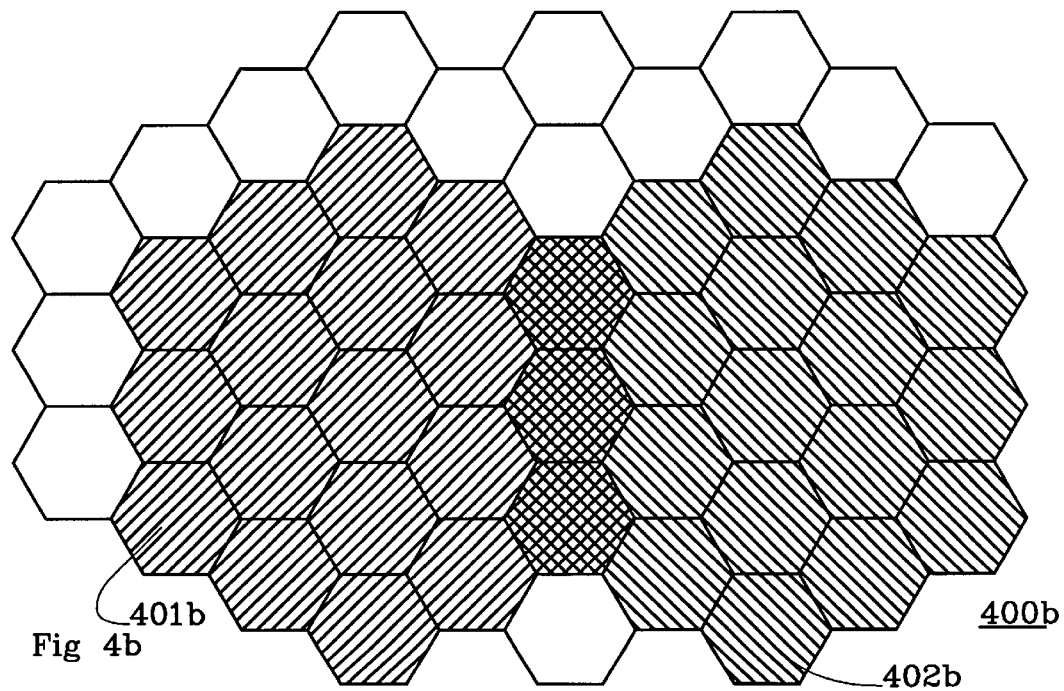

FIG. 4b describes a PLMN-system where cells may belong to more than one Location Area. Since the Las 401a, 402a, shown as hatched areas, are overlapping two mobile stations residing in a cell may be registered as belonging to two different LAs. An example of a system with overlapping LAs is the PDC system. In such systems the procedure 202 shown in FIG. 2 and the procedure 302 shown in FIG. 3 need be performed with respect to all location areas containing the cell in question.

FIG. 5 is a flow-chart which illustrates a method in a system, operating according to both first and second aspects of the invention. In this method, the starting condition 501 is a first cell e.g. C1 without a PDCH. In a block 502 of this method, the system awaits one of three events:

a) That a subscriber station is registered in the system with respect to any Location Area containing said first cell C1, as earlier mentioned, in a manner indicating that it is or prepared to transmit or receive packet data in any location area LA containing the cell C1, b) That a packet session is begun in, or transferred to, a neighbouring cell, e.g. cell C2, of said first cell C1, or c) That a timer dedicated to the method expires.

If any of the events a) or b) occurs then a test 503 is performed to find out whether any channel in the first cell C1 is configured as a PDCH. If this is the case the timer is restarted 509 and the system returns to the first mentioned block 502. If the result of the test 503 performed is that no PDCH is configured in the first cell C1 then a TCH is reconfigured 504 into a PDCH, after which the timer is started 505 and the system returns to the first mentioned block 502. When, in the first mention block 502, the event c) occurs, then two tests 506, 507 are performed by the system. First a test 506 is performed to find out whether any subscriber station is registered in the system with respect to any LA containing the first cell C1 in a manner indicating that it is prepared to perform packet data communication in any location area containing cell C1. If not, then a second test is performed to find out if any packet data sessions are going on in any neighbouring cell, e.g. cell C2, of the first cell C1. The described order between these two tests is not a necessity. If the answer of any of these tests is yes then the timer is restarted 509 and the system returns to the first mentioned block 502. If the answer of both these test, however, are no then the PDCH in cell C1 is reconfigured 508 into a TCH. After this the system returns to the first mentioned block 502. This embodiment is preferably software-implemented.

The above described embodiments serve only as examples of how the invention may be carried out and do not limit the extension of the protection sought, which is only limited by the appended claims. FIG. 1, for instance, has been drafted from the GSM-system involving separate BSCs and non-overlapping LAs. The invention, however, is also useful in the PDC system where LAs are overlapping and where the BSCs are integrated in the MSCs. The D-AMPS system is another example of a mobile radio system where the invention is useful.

What is claimed is:

1. A method in a cellular radio communications system comprising a plurality of cells, where each cell is assigned a number of channels, constituted by timeslots and frequencies, and where said channels may be configured either to be optimised for voice transmission, as traffic channels, or packet data transmission, as packet data channels; where subscriber stations in a cell may be registered in the system with respect to said cell in a manner indicating that they are prepared to perform voice communication or packet data communication or both; a first cell in said system having one packet data channel, said packet data channel being unused, characterised by the following steps:

a first checking procedure to find out if any subscriber station in said first cell of the system is registered in the system with respect to said cell in a manner indicating that it is prepared to perform a packet data communication;

a second checking procedure to find out if any packet data session is performed by any subscriber station in any of the neighbouring cells of said first cell; and reconfiguring said packet data channel in said first cell into a traffic channel if the result of the first checking procedure is that no subscriber station in said first cell of the system is registered in the system with respect to said first cell in a manner indicating that it is prepared to perform a packet data communication; and the result of the second checking procedure is that no packet data session is performed by any subscriber station in any of said neighbouring cells.

2. A method according to claim 1 characterised in that the second checking procedure is performed only regarding subscriber stations in neighbouring cells registered in the system as being non-stationary.

3. A method in a cellular radio communications system comprising a plurality of cells, where each cell is assigned a number of channels, constituted by timeslots and frequencies, and where said channels may be configured either to be optimised for voice transmission, as traffic channels, or packet data transmission, as packet data channels; where subscriber stations in a cell may be registered in the system with respect to a location area containing said cell in a manner indicating that they are prepared to perform voice communication or packet data communication or both; a first cell in said system having one packet data channel, said packet data channel being unused, characterised by the following steps:

a first checking procedure (202) to find out if any subscriber station in any location area containing said first cell is registered in the system with respect to any such location area in a manner indicating that it is prepared to perform a packet data communication;

a second checking procedure (203) to find out if any packet data session is performed by any subscriber station in any of the neighbouring cells of said first cell; and reconfiguring (204) said packet data channel in said first cell into a traffic channel if the result of the first checking procedure is that no subscriber station in any location area containing the first cell is registered in the system with respect to any such location area in a manner indicating that it is prepared to perform a packet data communication; and the result of the second checking procedure is that no packet data session is performed by any subscriber station in any of the neighbouring cells of said first cell.

4. An arrangement in a cellular radio communications system comprising a plurality of cells, where each cell is assigned a number of channels, constituted by timeslots and frequencies, and where said channels may be configured either to be optimised for voice transmission, as traffic channels, or packet data transmission, as packet data channels; where mobile stations in a cell may be registered in the system with respect to a location area containing said cell in a manner indicating that they are prepared to perform voice communication or packet data communication or both; a first cell in said system having one packet data channel, said packet data channel being unused, characterised by the following steps:

means for a first checking procedure to find out if any subscriber station in any location area containing said first cell is registered in the system with respect to any such location area in a manner indicating that it is prepared to perform a packet data communication;

means for a second checking procedure to find out if any packet data session performed by any subscriber station in any of the neighbouring cells of said first cell; and means for reconfiguring said packet data channel in said first cell into a traffic channel if the result of the first checking procedure is that no subscriber station in any location area containing the first cell is registered in the system with respect to any such location area in a manner indicating that it is prepared to perform a packet data communication; and the result of the second checking procedure is that no packet data session is performed by any subscriber station in any of the neighbouring cells of said first cell.

5. An arrangement according to claim 4 characterised in that the event b only occurs regarding subscriber stations in neighbouring cells registered in the systems as being non-stationary.

\* \* \* \* \*